US008456877B2

(12) United States Patent
Angerer et al.

(10) Patent No.: US 8,456,877 B2
(45) Date of Patent: Jun. 4, 2013

(54) DATA EXCHANGE BETWEEN INVERTERS IN AN INVERTER SYSTEM

(75) Inventors: Christian Angerer, Sierning (AT); Hannes Heigl, Prambachkirchen (AT); Harald Kreuzer, Linz/Donau (AT)

(73) Assignee: Fronius International GmbH, Pettenbach (AT)

( * ) Notice: Subject to any disclaimer, the term of this patent is extended or adjusted under 35 U.S.C. 154(b) by 1036 days.

(21) Appl. No.: 12/311,370

(22) PCT Filed: Sep. 17, 2007

(86) PCT No.: PCT/AT2007/000441
§ 371 (c)(1),
(2), (4) Date: Mar. 26, 2009

(87) PCT Pub. No.: WO2008/036990
PCT Pub. Date: Apr. 3, 2008

(65) Prior Publication Data
US 2009/0290393 A1 Nov. 26, 2009

(30) Foreign Application Priority Data
Sep. 28, 2006 (AT) .................... A 1616/2006

(51) Int. Cl.
*H02M 3/315* (2006.01)
*H02M 3/337* (2006.01)
*H02M 3/338* (2006.01)

(52) U.S. Cl.
USPC ............................................. 363/95; 363/71

(58) Field of Classification Search
USPC .............. 363/71–72, 95, 97–98, 49, 55, 56.02
See application file for complete search history.

(56) References Cited

U.S. PATENT DOCUMENTS

| 4,328,429 | A | * | 5/1982 | Kublick | 307/58 |
| 5,191,520 | A | * | 3/1993 | Eckersley | 363/72 |
| 5,212,630 | A | * | 5/1993 | Yamamoto et al. | 363/71 |

(Continued)

FOREIGN PATENT DOCUMENTS

| DE | 101 53 846 | 5/2003 |
| DE | 10 2004 015 227 | 10/2005 |

(Continued)

OTHER PUBLICATIONS

International Search Report.

(Continued)

*Primary Examiner* — Adolf Berhane
*Assistant Examiner* — Nusrat Quddus
(74) *Attorney, Agent, or Firm* — Collard & Roe, P.C.

(57) ABSTRACT

The invention relates to an inverter system (1) with several inverters (2), each of which having at least one control unit (6), with at least one line (7) each being provided between the inverters (2) for data exchange, as well as to an inverter (2), and to a method of operating several inverters (2) in such an inverter system (1). To achieve a high transmission safety, and a high data-transmission rate, it is provided that each inverter (2) has a communication device (8) which is connected to a control unit (6) of the inverter (2) and to the data lines (7) of two neighboring inverters (2), and which has a switching device (13), the switching device (13) being configured to switch the data lines (7) between a ring system and between a bus system logically based on this ring system.

23 Claims, 3 Drawing Sheets

U.S. PATENT DOCUMENTS

| | | | |
|---|---|---|---|
| 5,473,528 A | 12/1995 | Hirata et al. | |
| 7,502,240 B2 * | 3/2009 | Leung et al. | 363/72 |
| 7,577,005 B2 * | 8/2009 | Angerer et al. | 363/55 |
| 7,593,243 B2 * | 9/2009 | Ganev et al. | 363/44 |
| 2005/0073783 A1 | 4/2005 | Luo et al. | |
| 2006/0083039 A1 * | 4/2006 | Oliveira et al. | 363/131 |
| 2007/0011365 A1 | 1/2007 | Jurisch et al. | |
| 2011/0283272 A1 * | 11/2011 | Angerer et al. | 717/168 |

FOREIGN PATENT DOCUMENTS

| | | |
|---|---|---|
| DE | 10 2004 030 228 | 1/2006 |
| EP | 1 503 262 | 2/2005 |
| WO | WO 2005/117136 | 12/2005 |
| WO | WO 2006/084294 | 8/2006 |

OTHER PUBLICATIONS

"IEC, International Electrotechnical Vocabulary Online," 2008, International Electrotechnical Commission, Retrieved on Jan. 15, 2008, XP002465239. (ISR).

Mak, C. et al., Bus-Tie Synchronization and Load Share Technique in a Ring Bus System with Multiple Power Inverters; Twentieth Annual IEEE Applied Power Electronics Conference and Exposition, Band 2, Mar. 6-10, 2005, pp. 871-874. (Austrian OA).

Mohan et al., "Power Electronics: Converters, Applications, and Design," John Wiley & Sons, Inc., 1989, pp. 102-104; 402-404.

* cited by examiner

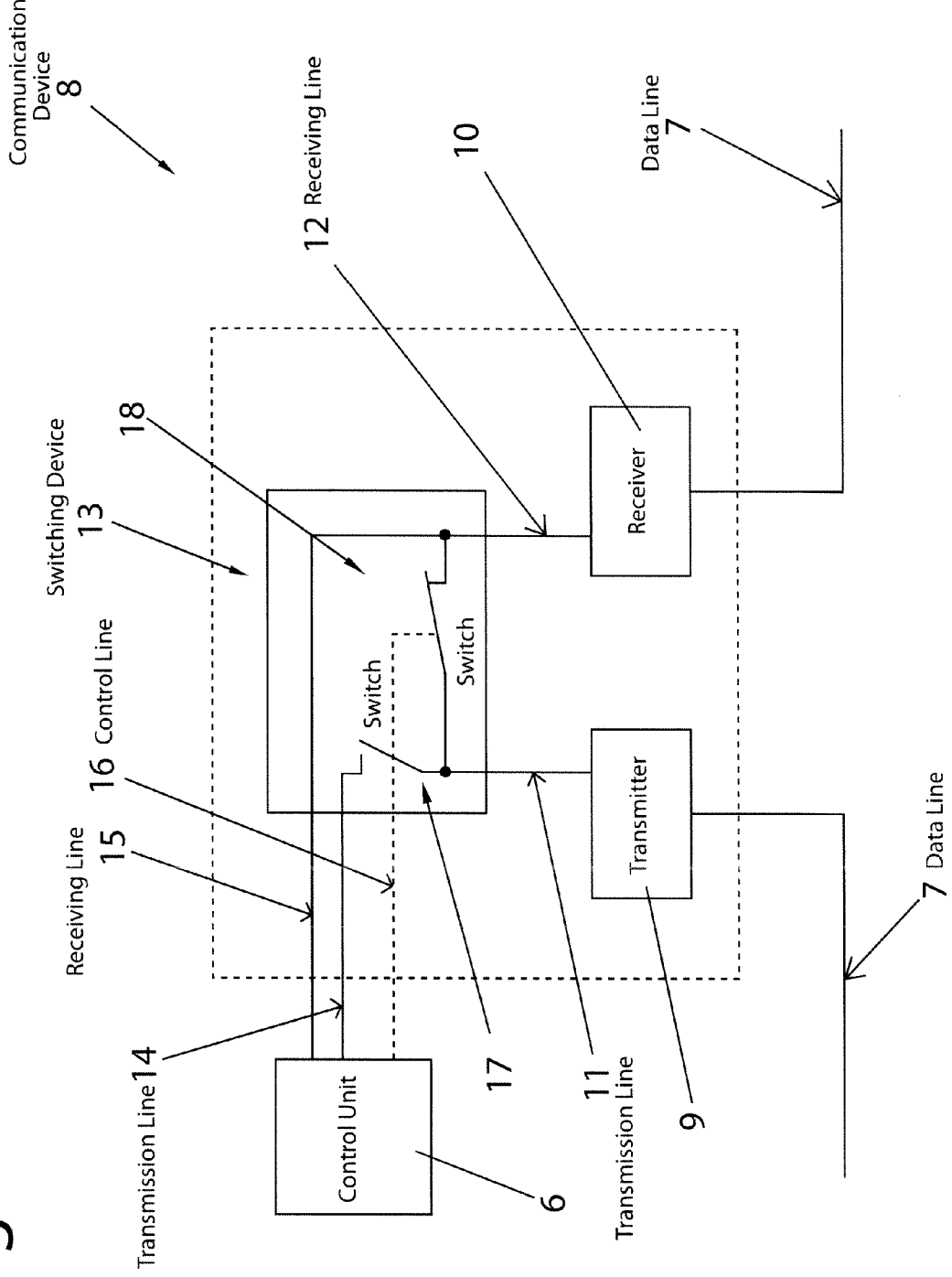

DATA EXCHANGE BETWEEN INVERTERS IN AN INVERTER SYSTEM

CROSS REFERENCE TO RELATED APPLICATIONS

This application is the National Stage of PCT/AT2007/00441 filed on Sep. 17, 2007, which claims priority under 35 U.S.C. §119 of Austrian Application No. 1616/2006 filed on Sep. 28, 2006. The international application under PCT article 21(2) was not published in English.

The invention relates to an inverter system with several inverters, each of which having at least one control unit, with at least one line each being provided between the inverters for data exchange.

Furthermore, the invention relates to an inverter for an above-mentioned inverter system, with at least one control unit, and connections for lines for connection to other inverters for data exchange.

Likewise, the invention relates to a method of operating several inverters, each with one control unit of an inverter system, with data being exchanged between the inverters via at least one line.

The object of the invention is to create an above-mentioned inverter system, and an inverter therefor, and a method for operating several inverters of an inverter system, by means of which a high transmission safety, on the one hand, and a high data-transmission rate, on the other hand, can be ensured.

The object of the invention is achieved by an above-mentioned inverter system in which each inverter has a communication device which is connected to a control unit of the inverter and to the data lines of two neighboring inverters, and which has a switching device, the switching device being configured to switch the data lines between a ring system, in which all inverters are interconnected in a ring via the data lines, and between a bus system, which is logically based on the ring system, in which all inverters are connected to a common bus comprised of the data lines. Here, it is advantageous that two contrary bus systems can be realized with one physical connection. Accordingly, specific use can be made of the advantages of the different bus systems. That is, use can be made of the transmission safety of the ring system during starting procedure, and of the high transmission rate of the bus system during running operation. Under "bus system logically based on the ring system" a connection system is to be understood which differs from a real bus system in that no bidirectional data exchange occurs but usually a unidirectional data traffic from one inverter to the other, via the data lines interconnected to a bus system.

The measure of claims 2 to 5 provides the advantage that the control unit of each inverter also always includes the data transmitted, irrespective of whether evaluation, or processing, is necessary. Thus, the data are in the respective case forwarded without time delay, the data being at the same time provided to the control unit.

The measures of claims 6 to 8 prevent received data from being directed to the transmission line of the control unit, and prevent data sent by the control unit from being directed to the receiving line of the receiver.

The measures of claims 9 and 10 provide for an automatic galvanic separation between the inverters, with no additional circuit being necessary.

The inventive object is also achieved by an above-mentioned inverter for an above-mentioned inverter system in which a communication device is provided which is connected to the control unit of the inverter and to the data-line connections, and which has a switching device, the switching device being configured to switch the data lines between a ring system, in which all inverters are interconnected in a ring via the data lines, and between a bus system, which is logically based on the ring system, in which all inverters are connected to a common bus comprised of the data lines. The advantages of these and of the other dependent claims 12 to 18 are to be learned from the above description of the inverter system.

The object of the invention is also achieved by an above-mentioned method of operating several inverters of an inverter system, wherein during a starting procedure of the inverter system, the inverters are interconnected to a physical and logical ring system via a communication device with a switching device, in which ring system all inverters are interconnected in a ring via the data lines, and wherein after the starting procedure has been finished, the connection of the inverters is switched to a bus system, which is logically based on the ring system and in which all inverters are connected to a common bus formed by the data lines. Here, it is advantageous that the set-up of the inverter system is checked automatically. Due to the physical position in the ring system, the individual inverters can likewise be identified uniquely, with no predefined numbering being necessary, e.g.

The measures of claims 20 to 21 allow for an automatic initialization of all inverters of the inverter system to be achieved at very high transmission safety.

According to claims 22 and 23, it is also advantageous that it is detected when all inverters are ready to operate, thus ensuring a safe start-up. Likewise, this enables reconfigurations of inverters, new inverters, etc., to be detected immediately.

By the measure of claim 24, it is advantageously achieved that the inverter system is configured in a completely automated manner, this being effected in a manner substantially irrespective of the physical connections.

By the measures of claims 25 to 28, data collisions on the communication link are advantageously prevented.

According to claim 29, it is also advantageous that the data are forwarded with substantially no time delay or with very little latency since the data do not have to be forwarded actively, and since there is no processing effort, associated therewith, for the control unit. This is why this topology is particularly well-suited for synchronization of inverters.

A reset data packet sent by an inverter of the inverter system allows for the switching device to switch the connection of the inverters to the ring system.

Further advantages can be gathered from the following description.

The present invention will be explained in more detail by way of the enclosed schematic drawings. Therein:

FIG. 3 shows the communication device of FIG. 2 in the second switch position.

Initially, it is pointed out that same parts of the exemplary embodiments are designated by same reference numbers.

Figure 1:
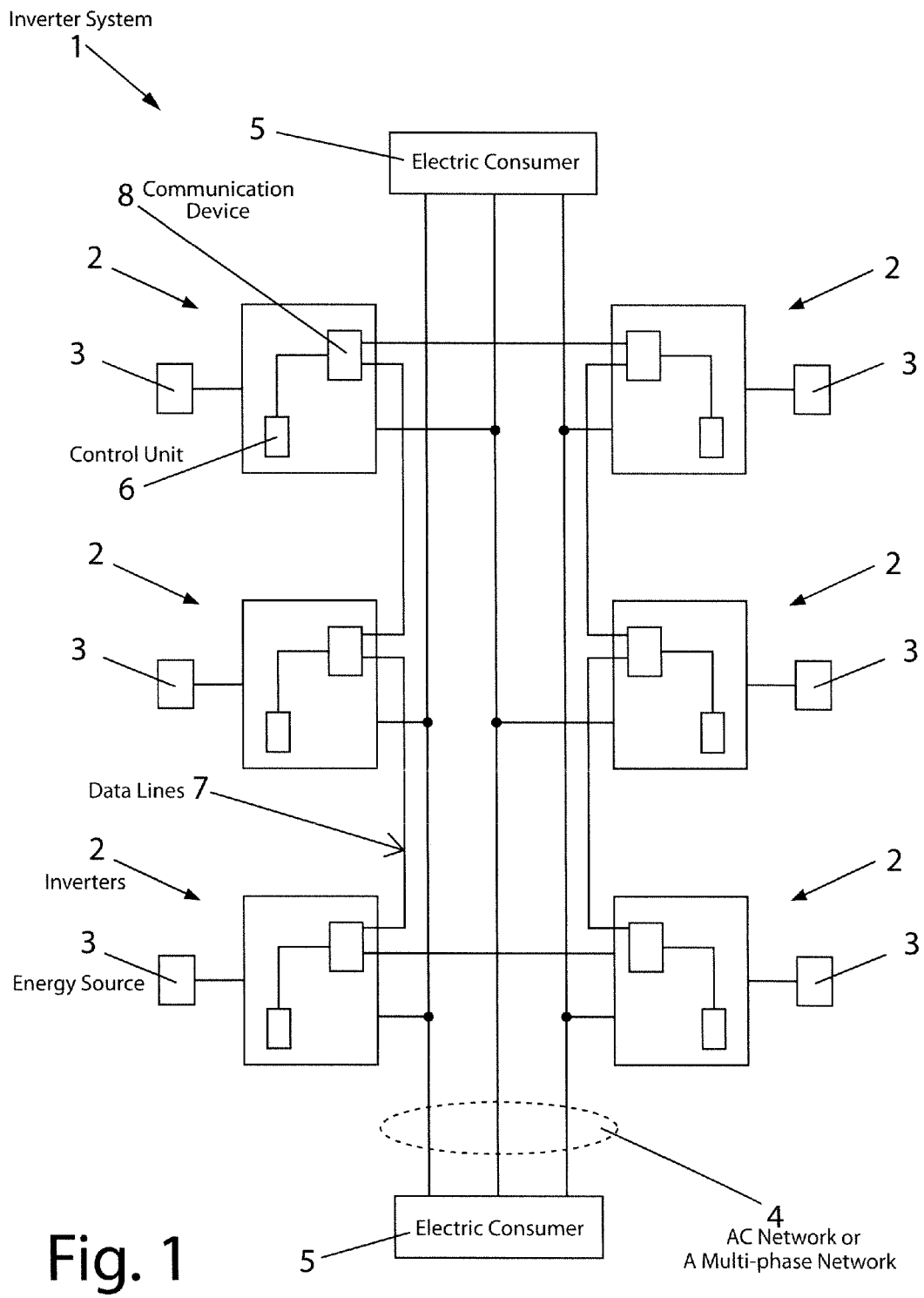
FIG. 1 shows a schematic overview of an inverter system which comprises several inverters.

FIG. 1 shows a usual set-up of an inverter system 1 with several, in this case six, inverters 2 connected in parallel at the output. Since the individual components and/or structural units, and functions, of inverters 2 have already been known from the prior art, they will not be addressed in more detail hereinafter.

The inverters 2 have, e.g., one DC-DC converter, an intermediate circuit, and a DC-AC converter (not illustrated). To one input of the DC-DC converter, an energy source 3 and/or an energy generator is connected which may be formed of one or several solar modules, or a battery, interconnected in parallel and/or in series, e.g. The output of each inverter 2 is connected to one or several electric consumers 5 via an AC network or a multiple-phase network 4, e.g. a three-phase network. The consumer 5 is comprised, e.g. of an engine, a refrigerator, a radio unit, etc.

Preferably, the inverter system 1 is used as a system of electrically isolated inverters for feeding consumers 5 decoupled from public power grid. The use of several inverters 2 may provide more power for operating the consumers 5, on the one hand. The redundant structure due to the use of several inverters 2 allows for breakdown probabilities of the inverter system 1 to be reduced, on the other hand, thus enabling power supply of important consumers 5 in a breakdown-safe manner.

Furthermore, the inverter 2 has a control unit 6 which may be formed by, e.g. a microprocessor, a microcontroller or a computer, via which the individual structural units, in particular of the circuit elements included therein, may be controlled appropriately. To this end, the individual control sequences are stored in the control unit 6 via appropriate software programs and/or data and/or characteristic curves.

The set-up with several inverters 2 connected in parallel, which is shown in FIG. 1, preferably serves for ensuring a defined distribution of the power required by the consumer(s) 5 to the individual inverters 2. Here, there is the possibility to design the inverters 2 to have the same structure so as to enable a symmetrical and even load distribution between the inverters 2. Furthermore, inverters 2 of different types, e.g. of different power classes and/or nominal power may be used in parallel running operation, wherein in this case an appropriate proportional load distribution, in particular a nominal-power-dependent load distribution, to the inverters 2 is effected. For example, in case of an inverter system 1 with two inverters 2 where the second inverter 2 is operated with doubled nominal power compared to the first inverter 2, the inverter system 1 is controlled such that the second inverter 2 also supplies the double power to the consumer(s) 5.

Figure 2:
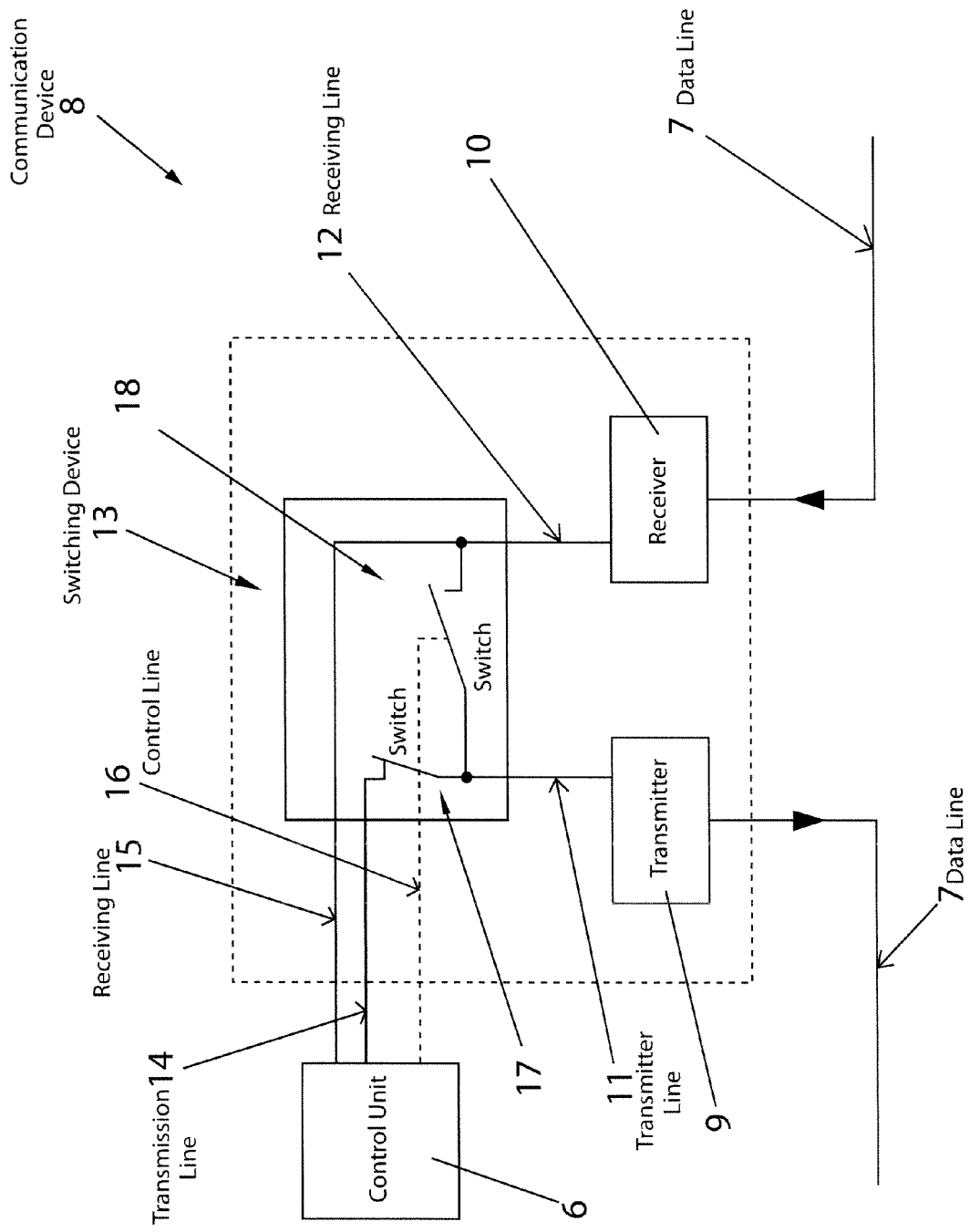
FIG. 2 shows the communication device with the inventive switching device of an inverter in a first switch position.

To ensure safe running operation of the inverters 2 of the inverter system 1 connected in parallel, these inverters 2 are each interconnected via at least one data line 7, e.g. an optical waveguide, for signal and/or data exchange. To this end, the inverters 2 have communication devices 8 which, according to FIG. 2, comprise a transmitter 9 and a receiver 10 which are connected to the control unit 6 via a transmission line 11, and a receiving line 12. In particular, the inverters 2 are synchronized via this data line 7 during running operation such that the sinusoidal AC voltages are in the same phase at the outputs of the inverters 2, i.e. have the same zero crossings. Consequently, a correspondingly fast communication via the data line 7 is necessary.

According to the invention, it is provided for the data lines 7 to be also used for safe start-up of the inverter system 1, imposing completely different requirements on the type of data transmission than in case of synchronization. Consequently, a high transmission safety has to be ensured for detecting all inverters 2 in the inverter system 1.

To allow for this to be realized via the line 7 arranged between the inverters 2, e.g. electrically isolated inverters with HF transformers, a switching device 13 is integrated into the communication device 8 of the inverter 2. In the following, the switching device 13, and the corresponding method of switching between a ring system and a bus system, will be explained in more detail by way of combining FIGS. 1, 2, and 3.

The inventive switching device 13 is integrated into the communication device 8 in a manner that the transmission line 11, and the receiving line 12 to the control unit 6, can be interrupted and/or switched appropriately. To this end, the switching device 13 is preferably comprised of a CMOS logic chip, a relay, an EPLD (erasable programmable logic device, simple analog switches, or the like.

As can be seen from FIG. 1, the data line 7 between the inverters 2 is physically realized in the form of a ring system and/or a ring topology. That is, each inverter 2 is connected to neighboring inverters 2. Here, the data and/or the data packets are transmitted from one inverter 2 to the next in a step-wise manner, with each inverter 2 having to evaluate the data before forwarding them.

To this end, the switching device 13 is switched in a manner that the transmission line 11 of the transmitter 9 is connected to a transmission line 14 of the control unit 6, and that the receiving line 12 of the receiver 10 is connected to the receiving line 15 of the control unit 6. That is, a switch 17 which is activated by the control unit 6 via a control line 16, and which connects the transmission line 11 with the transmission line 14, is closed. Likewise, a further switch 18 which connects the receiving line 12 to the transmission line 11 is activated by the control unit 6, which switch 18 behaves in a manner inverting to the switch 17, i.e. is opened in the present case. In such a position of the switch 17 and 18 of the switching device 13, the inverter 2 uses the ring system for communication. It is of course also possible for the switch 17 and 18 to be comprised by one switch, e.g. 17, only. Here, the switch 17 serves as a change-over switch which simply connects the transmission line 11 either to the transmission line 14 or to the receiving line 12. Since the ring system ensures high data-transmission safety, it is thus safeguarded that all inverters 2 will be detected when the inverter system 1 is starting up.

The inverter system 1 is started up, and the starting procedure is initiated, in a manner that an inverter 2 which has been defined as the master during, e.g., the first starting of the inverter system 1 is the first to send a reset data packet.

In case that the inverters are not already in the ring topology, this reset data packet prompts all inverters 2 to be switched to the ring topology necessary for start-up. Certainly, the master in the inverter system 1 can also be determined in an automatic fashion. For example, each inverter 2 that is the first to send a data packet can be determined as the master.

After sending the reset data packet, the master will send a further data packet, e.g. a so-called "bus-init packet". According to the ring topology, the bus-init packet is forwarded to the control unit 6 of the inverter 2 via the receiver 10, the receiving line 12, the switching device 13, and the receiving line 15, and will thereafter be evaluated. Before the bus-init packet will be sent to the next inverter 2 via the transmission line 14, the switching device 13, the transmission line 11, and the transmitter 9, via the data line 7, the control unit 6 attaches a so-called inverter ID and/or an initialization packet to the bus-init packet of the master. Thus, the next inverter 2 receives the bus-init packet to which an inverter ID has been added, and adds its own inverter ID. This procedure will be repeated until the master receives the bus-init packet it has sent itself which includes the respective attached inverter IDs. Due to the number of inverters' IDs attached the master knows how many inverters 2 are in the inverter system 1. Likewise, receiving the bus-init packet ensures that all the inverters 2 are ready to operate, and that the master has been informed on the configuration of the individual inverters 2. Such information is preferably included in the inverter IDs which is formed, e.g. by the serial number of the inverter 2, by its serial number in combination with the software number, etc. The inverter ID also ensures that each inverter 2 in the inverter system 1 can be uniquely addressed, this being realizable without predefined addressing. For example, an inverter 2 can also be addressed uniquely via its physical position in the inverter system 1.

Such an initialization of the inverters 2 in the inverter system 1 ensures a safe communication, in particular as regards the synchronization of the inverters 2 necessary during running operation since the appropriate addressing allows for the data packets to be uniquely allocated to the respective inverter 2. Here, the data packet will just be forwarded to the next inverter 2 in the ring system until it is received by the appropriate inverter 2. Then, the initialization is finished, and the start-up inverter system 1 can change to running operation.

According to the invention, the communication during running operation of the inverter system 1 is nevertheless effected via the bus topology, providing for a substantially faster data transmission, in particular as regards synchronization. Preferably, the data transmission in the bus topology is serial or asynchronous. That is, the bits of which a data packet consists are transmitted one after the other, wherein one start bit is sent before the data bits, e.g. eight data bits, with one stop bit being sent after the data bits. Since the data transmission in the control unit 6 takes place mostly in parallel, a (serial-parallel) conversion is necessary, e.g. via an UART (universal asynchronous receiver transmitter) to which the transmission line 14, and the receiving line 15, have been connected.

Preferably, the process of switching from the ring system to the bus system based logically on the ring system after the starting procedure is the following:

The master sends a switching data packet to the next inverter 2, with said data packet being evaluated by the control unit 6. The evaluation result will prompt the data packet received by the master to be transmitted to the next inverter 2, at first via the transmission line 14, the switching device 13, and the transmission line 11, the control unit 6 then causing a switch-over of the switches 17, 18 via the control line 16. That is, the connection between the transmission line 14, and the transmission line 11, is interrupted by the switch 17, and the connection between the receiving line 12, and the transmission line 11, will be established via the switch 18. In this fashion, each inverter 2 of the inverter system 1 will be switched to the bus topology in a step-wise manner until the master again receives the data packet sent by itself.

Preferably, also further information is sent to the inverters 2 along with the switching data packet, e.g. the inverter IDs of all inverters 2 in the inverter system 1, allowing for each inverter 2 to send data packets directly to each further inverter 2. Likewise, it is advantageous if a time frame is allocated by the switching data packet to the inverter 2 during which time frame the inverter 2 is allowed to send data packets to the data line 7 and/or to the bus. Preferably, no inverter 2 sends anything during the period between the time frames. Thus, always only one inverter 2 in the inverter system 1 sends data which will then be received substantially directly by the other inverters 2 before the next inverter 2, in its time frame, is at all given the permission to send data to the bus. This prevents data collisions, and ensures a safe and fast communication.

Thanks to the switching procedure, the inverter system 1 is now in the bus topology based logically on the ring system. This is why the data transmission is not bidirectional but unidirectional in the bus system as well, as is usual with prior-art bus systems. With the inventive parallel switching of the inverters 2, it is however of essentially higher importance that transmission safety for detecting the inverters 2 in the system, is combined with the high data-transmission rate during running operation. Furthermore, the delay times for data transmission from one inverter 2 to the neighboring inverter 2, are negligible, with the data being transmitted via all further inverters 2. Thus, one can definitely talk about data transmission without time delay.

If an inverter 2 sends a data packet to the bus, all inverters 2 in the system 1 will automatically receive the data packet since it will be received by the receiver 10, transmitted to the transmitter 9 via the receiving line 12, the switch 18, and the transmission line 11, and will appropriately be forwarded to the next inverter 2. That is, the control unit 6 will not evaluate the data before the data are forwarded. According to the structure of the switching device 13, the data packet received will yet also be forwarded to the control unit 6 via the receiving line 15. This allows the control unit 6 to evaluate, and optionally process, the data packet, quasi without any time pressure, if it is designated for this inverter 2.

To enable an inverter 2, and its control unit 6, to answer to a data packet designated for it, the inverter 2 has to wait for the time frame allocated to it. For sending data during the time frame, it is necessary to disconnect the receiving line 12 from the transmission line 11 by opening the switch 18. At the same time, the switch 17 is closed by this procedure via the control line 16, thus connecting the transmission line 14 to the transmission line 11. Thus, the control unit 6 can send its response to the bus. Directly after sending data, the switches 17, 18 will again be switched via the control line 16, and the receiving line 12 will again be connected to the receiving line 11.

If an inverter 2—for whatever reason—causes an error which jeopardizes the communication between the inverters 2, the control unit 6 will send a reset data packet to the bus. As a consequence, all inverters 2 in the system 1 will switch to the ring system so as to allow for a restart of the system 1.

For safety reasons, it is also conceivable to integrate an automatic closing mechanism, with a discrete power supply, into the inverter 2. That is, e.g. in case of power breakdown with one inverter 2, the communication in the system 1 will not be interrupted. Accordingly, the switching device 13 is switched permanently to the bus system so as to maintain the data lines 7. For example, the automatic closing mechanism may be comprised of retriggerable monostable multivibrator.

Furthermore, it is also conceivable that substantially along with the initialization, it is also checked which inverter 2 is connected to which phase in case of a multiple-phase network, e.g. of the three-phase network 4. This is effected, e.g., in a manner that one inverter 2 applies a voltage to the phase. All inverters 2 which will then detect the voltage applied will correspondingly send a data packet to the data line 7 which will be correspondingly received by the inverter 2 which has applied the voltage. This will be correspondingly effected for each phase, wherein preferably that inverter 2 is allowed to apply voltage to the phase that is the first to do so. Accordingly, the information as to which inverters 2 are connected to which phase of the three-phase network 4 can be exchanged between the inverters 2.

This is of particular importance when the individual connections of the inverters 2 are connected randomly to a phase of the 3-phase network 4, or when at least one inverter 2 is added to the inverter system 1. Thus, all inverters 2 know how many further inverters 2 are also connected to the same phase, which is of importance for a defined distribution of load and/or consumers 5, as well as for synchronization of the inverters 2. Consequently, such a system allows for a completely automatic configuration of the inverter system 1.

The invention claimed is:

1. An inverter system (1) with several inverters (2), each of which having at least one control unit (6), with at least one line (7) each being provided between the inverters (2) for data exchange, wherein the data lines (7) between the inverters (2) are realized by optical waveguides, each inverter (2) has a communication device (8) which is connected to a control unit (6) of the inverter (2) and to the data lines (7) of two neighboring inverters (2), and which has a switching device (13), a transmitter (9) and a receiver (10), wherein the transmitter (9) is connected to the switching device (13) via a transmission line (11) and the receiver (10) is connected to the switching device (13) via a receiving line (12), and wherein the transmitter (9) of an inverter (2) is connected to the receiver (10) of the downstream inverter (2) and the receiver (10) of the inverter (2) is connected to the transmitter (9) of the previous inverter (2), the switching device (13) of each inverter (2) being configured to switch the data lines (7) by a switching data packet starting from an inverter (2) defined as the master and transmissible step by step unidirectionally from one inverter (2) to the next inverter (2) between a ring system used during a starting procedure of the inverter system (1), in which all inverters (2) are interconnected in a ring via the data lines (7) and the data are evaluated by the control unit (6) of each inverter (2) before being transmitted to the next inverter (2), and between a bus system, which is logically based on the ring system after completion of the starting procedure during a running operation of the inverter system (1), all inverters (2) being connected to a common bus formed by the data lines (7) and the data are sent substantially simultaneously and directly to all inverters (2) and the data are then evaluated by the control units (6) of all inverters (2), wherein a time window for transmitting data to the data line (7) is adapted to be assigned to each inverter (2) with the switching data packet, and the receiving line (12) is separated from the transmission line (11) for transmission in the time window.

2. The inverter system (1) according to claim 1, wherein the switching device (13) of each inverter (2) is connected to the at least one control unit (6) via at least one transmission line (14) and one receiving line (15).

3. The inverter system (1) according to claim 1, wherein the receiving line (15) of the control unit (6) is permanently connected to the receiving line (12) of the receiver (10) via the switching device (13).

4. The inverter system (1) according to claim 1, wherein via the switching device (13), the transmission line (11) can be connected optionally to the transmission line (14) of the control unit (6) or to the receiving line (12) of the receiver (10).

5. The inverter system (1) according to claim 1, wherein the switching device (13) of each inverter (2) includes at least one switch (17) which is connected to the control unit (6) of the inverter (2) via a control line (16).

6. The inverter system (1) according to claim 1, wherein the switching device (13) is comprised of a CMOS logic chip.

7. An inverter (2) for an inverter system (1) according to claim 1 with at least one control unit (6), and connections for lines (7) for connection to other inverters (2) for data exchange, wherein a communication device (8) is provided which is connected to the control unit (6) and the data-line connections, which connections for the data lines (7) are realized by optical wave guides, and which has a switching device (13), a transmitter (9) and a receiver (10), wherein the transmitter (9) is connected to the switching device (13) via a transmission line (11) and the receiver (10) is connected to the switching device (13) via a receiving line (12), and wherein the transmitter (9) may be connected to the receiver (10) of a downstream inverter (2) and the receiver (10) may be connected to the transmitter (9) of a previous inverter (2), the switching device (13) being configured to switch the data lines (7) by a switching data packet starting from an inverter (2) defined as the master and transmissible step by step unidirectionally to the next inverter (2) between a ring system used during a starting procedure of the inverter system (1), in which all inverters (2) are interconnected in a ring via the data lines (7) and the data are evaluated by the control unit (6) of each inverter (2) before being transmitted to the next inverter (2), and between a bus system, which is logically based on the ring system after completion of the starting procedure during a running operation of the inverter system (1), and in which all inverters (2) are connected to a common bus formed by the data lines (7) and the data are sent substantially simultaneously and directly to all inverters (2) and the data are then evaluated by the control units (6) of all inverters (2), wherein a time window for transmitting data to the data line (7) is adapted to be assigned to each inverter (2) with the switching data packet, and the receiving line (12) is separated from the transmission line (11) for transmission in the time window.

8. The inverter (2) according to claim 7, wherein the switching device (13) is connected to the at least one control unit (6) via at least one transmission line (14) and one receiving line (15).

9. The inverter (2) according to claim 7, wherein the receiving line (15) of the control unit (6) is permanently connected to the receiving line (12) of the receiver (10) via the switching device (13).

10. The inverter (2) according to claim 7, wherein via the switching device (13), the transmission line (11) can be connected optionally to the transmission line (14) of the control unit (6) or to the receiving line (12) of the receiver (10).

11. The inverter (2) according to claim 7, wherein the switching device (13) includes at least one switch (17) which is connected to the control unit (6) via a control line (16).

12. The inverter (2) according to claim 7, wherein the switching device (13) is comprised of a CMOS logic chip.

13. A method of operating several inverters (2), each with one control unit (6) of an inverter system (1), with data being exchanged between the inverters (2) via at least one line (7), wherein the data lines (7) realized by optical waveguides are being connected respectively with a transmitter (9) and a receiver (10) of a communication device (8) of each inverter (2), in that the transmitter (9) of an inverter (2) is being connected to the receiver (10) of the downstream inverter (2) and the receiver (10) of the inverter (2) is being connected to the transmitter (9) of the previous inverter (2), the transmitter (9) of each inverter (2) is being connected to a switching device (13) via a transmission line (11) and the receiver (10) of each inverter (2) is being connected to a switching device (13) via a receiving line (12), the inverters (2), during a starting procedure of the inverter system (1), are interconnected to a physical and logical ring system via a communication device (8) with a switching device (13), in which ring system all inverters (2) are interconnected in a ring via the data lines (7) and the data are evaluated by the control unit (6) of each inverter (2) before being transmitted to the next inverter (2), and wherein after the starting procedure has been finished during a running operation, the connection of the inverters (2) is switched by a switching data packet starting from an inverter (2) defined as the master and transmissible step by step unidirectionally to the next inverter (2) to a bus system, which is logically based on the ring system and in which all inverters (2) are connected to a common bus formed by the data lines (7) and the data are sent substantially simultaneously and directly to all inverters (2) and the data are then evaluated by the control units (6) of all inverters (2), wherein a time window for transmitting data to the data line (7) is assigned to each inverter (2) with the switching data packet, and the receiving line (12) is separated from the transmission line (11) for transmission in the time window.

14. The method according to claim 13, wherein an inverter (2) is defined as the master during the starting procedure.

15. The method according to claim 14, wherein the inverter (2), defined as the master, effects an initialization of the inverters (2) in the inverter system (1) during the starting procedure.

16. The method according to claim 15, wherein the inverter (2), defined as the master, sends a data packet to the inverter (2) connected thereto, and wherein the data packet is supplemented by an initialization packet before it will be transmitted to the downstream inverter (2).

17. The method according to claim 15, wherein an inverter (2) forwards the data packet to the inverter (2), which is next in the ring system, until the data packet is again received by the inverter (2) defined as the master.

18. The method according to claim 15, wherein it is checked during the starting procedure which inverter (2) is connected to which phase of a multiple-phase network (4), and wherein the inverters (2) will be synchronized appropriately as a function of this checking.

19. The method according to claim 14, wherein after the connection of the inverters (2) is switched by means of the data packet sent by the inverter (2), defined as the master, to the downstream inverter (2), with the inverters (2) switching to the bus system when receiving this data packet, the data packet is transferred to the downstream inverter (2) until the data packet is again received by the inverter (2) defined as the master.

20. The method according to claim 19, wherein when data are being sent, the switching device (13) of the inverter (2) connects the control unit (6) of the inverter (2) to the output.

21. The method according to claim 19, wherein after data has been sent, the switching means (13) of the inverter (2) disconnects the control unit (6) of the inverter (2) from the output.

22. The method according to claim 19, wherein after switching to the bus system, the data sent by an inverter (2) are automatically transferred to all further inverters (2) of the inverter system (1), this taking place substantially simultaneously and directly after sending.

23. The method according to claim 19, wherein the switching devices (13) use a reset data packet sent by an inverter (2) of the inverter system (1) to switch the connection of the inverters (2) to the ring system.

* * * * *